United States Patent Office 3,348,473
Patented Oct. 24, 1967

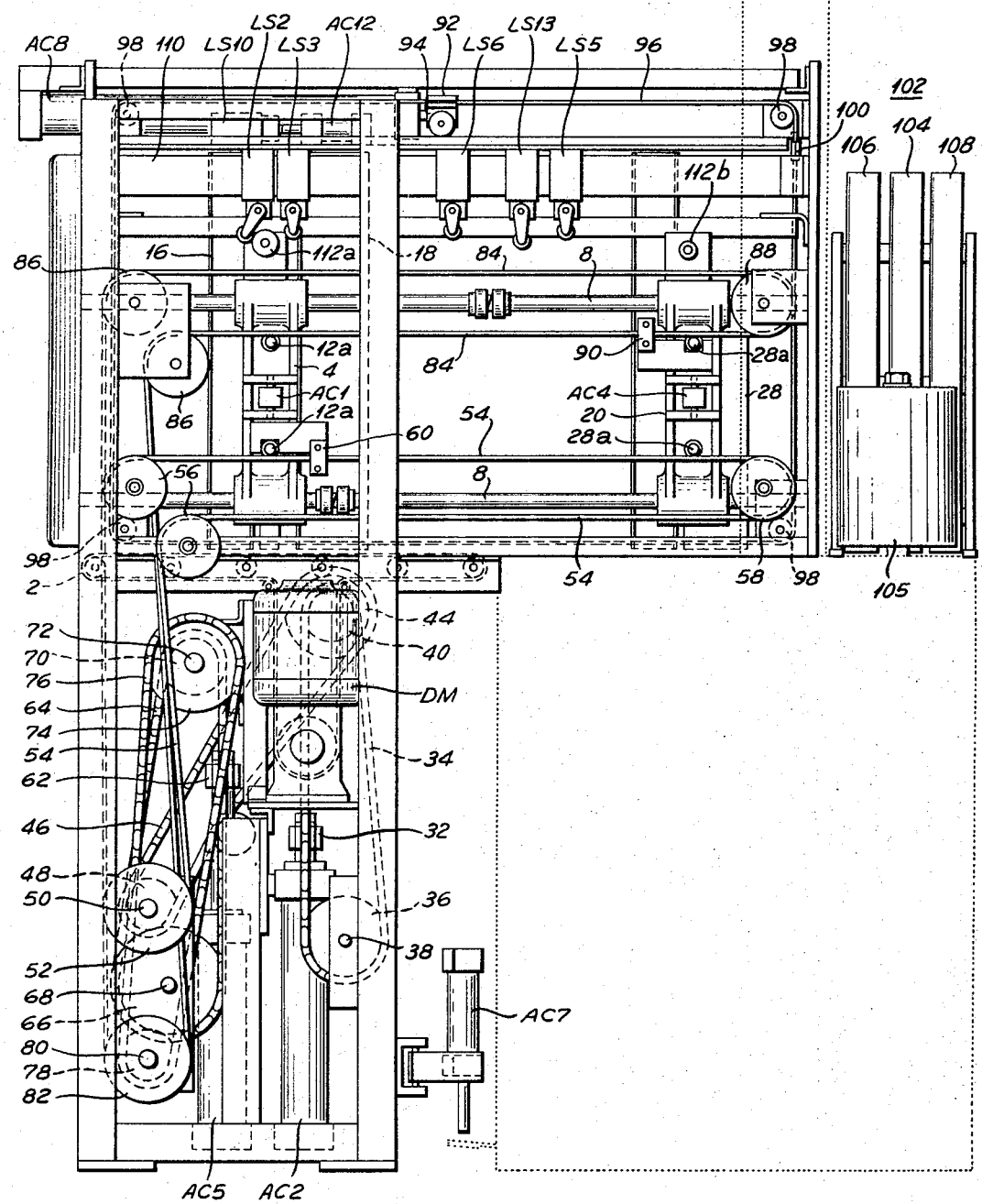

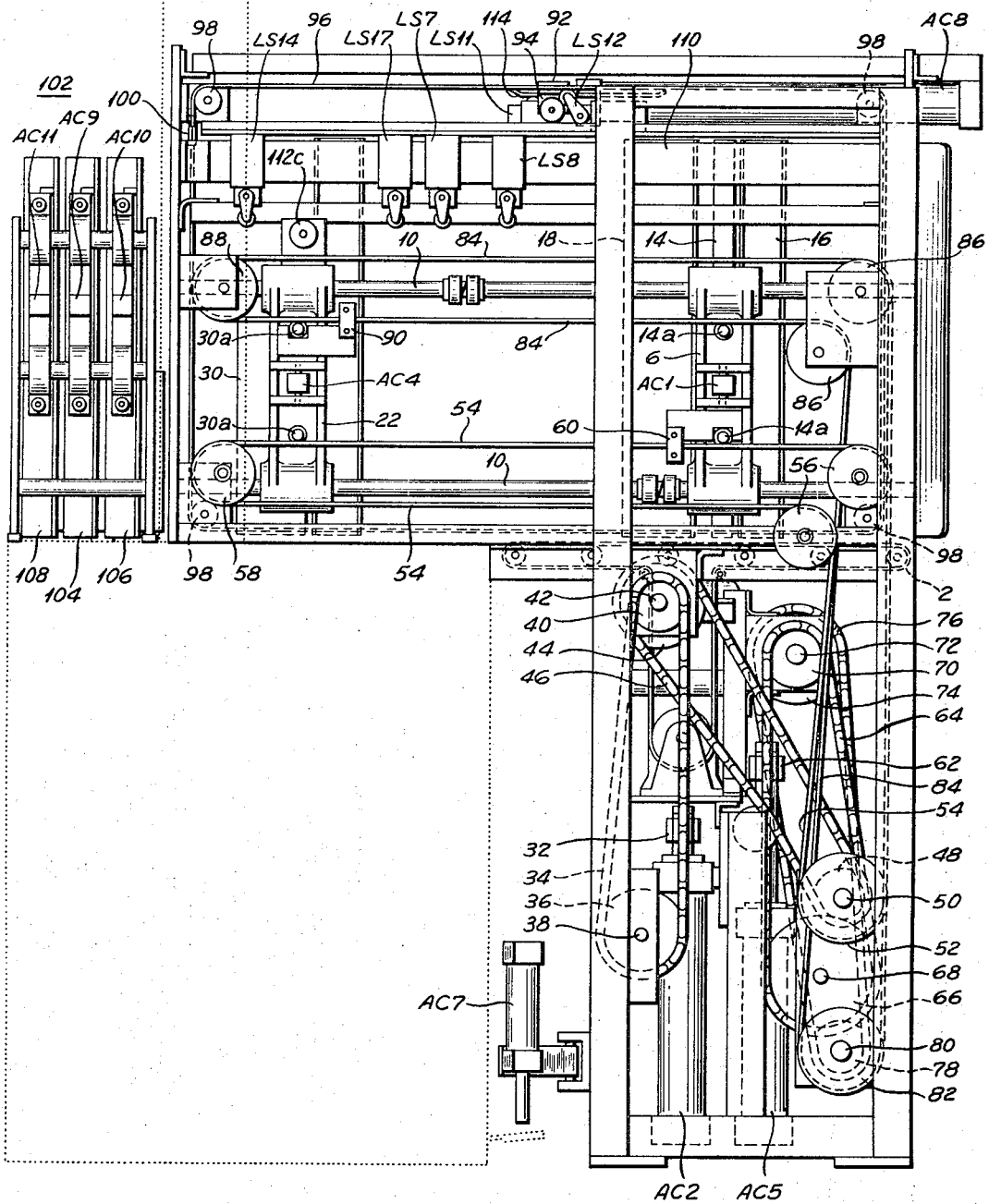

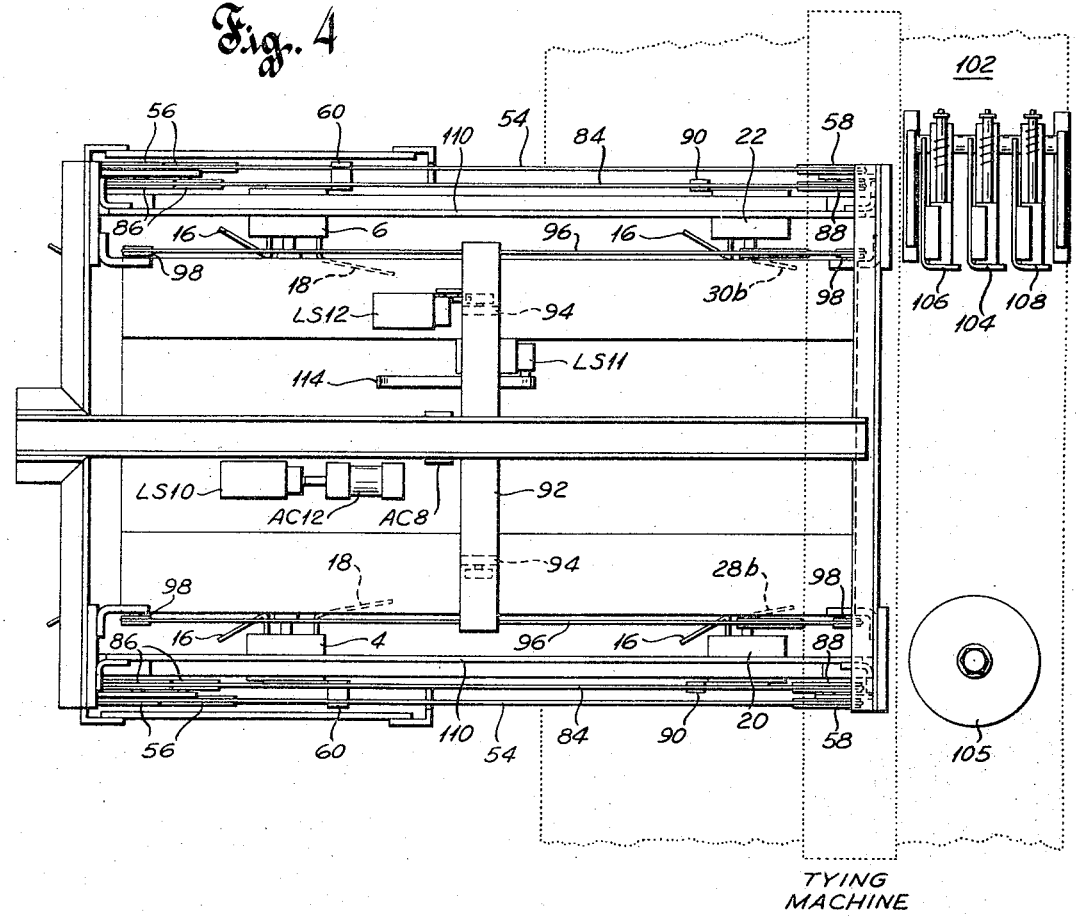
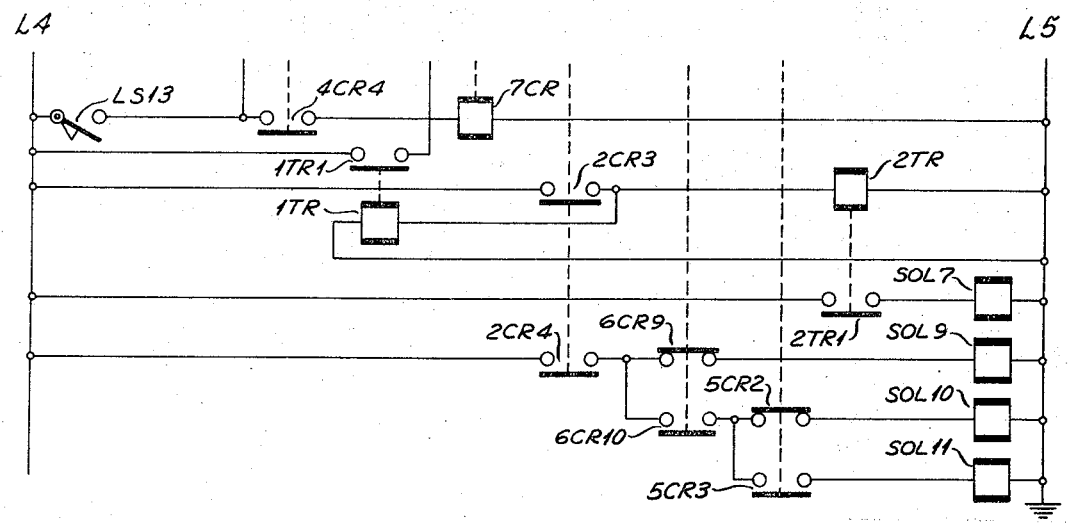

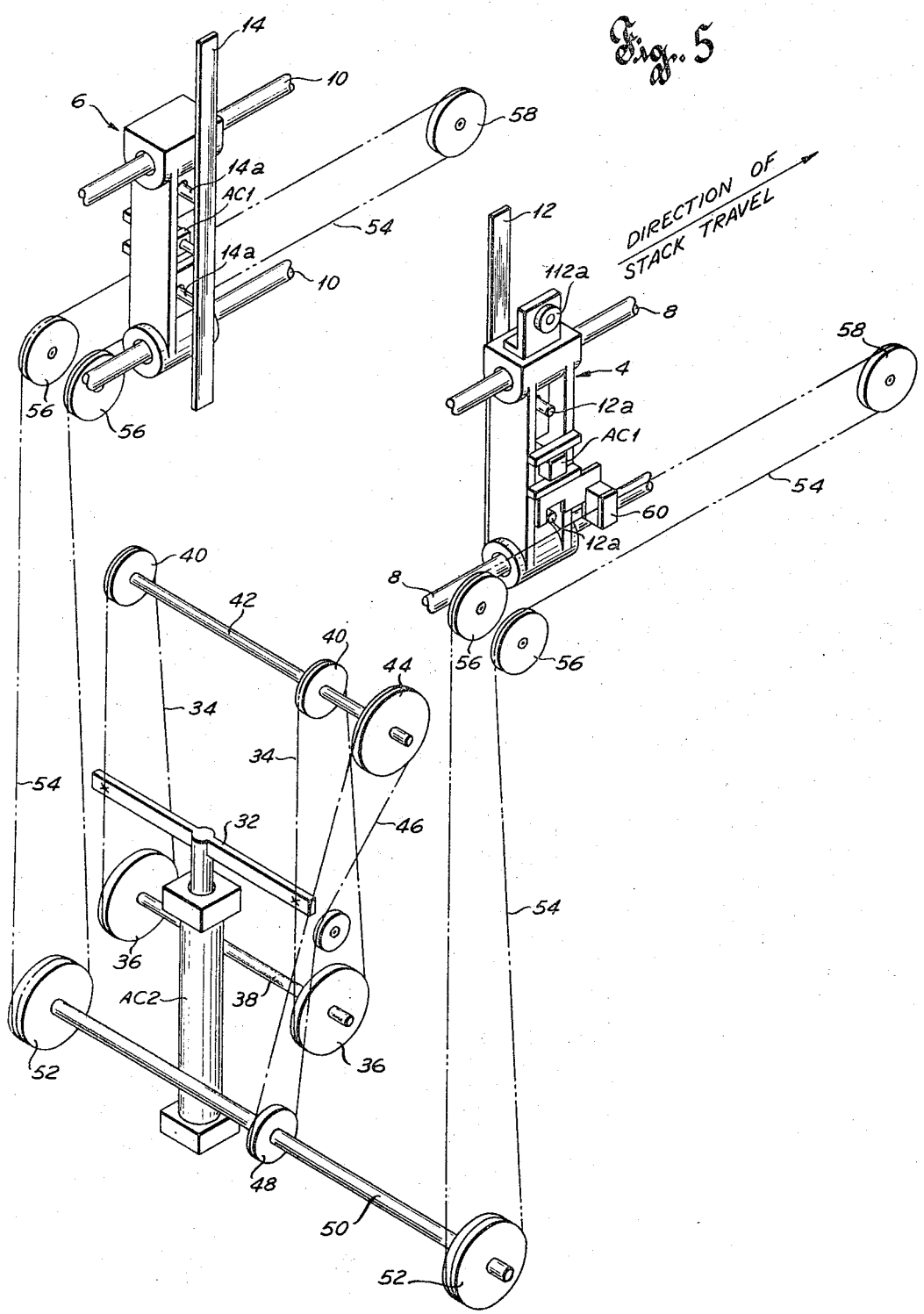

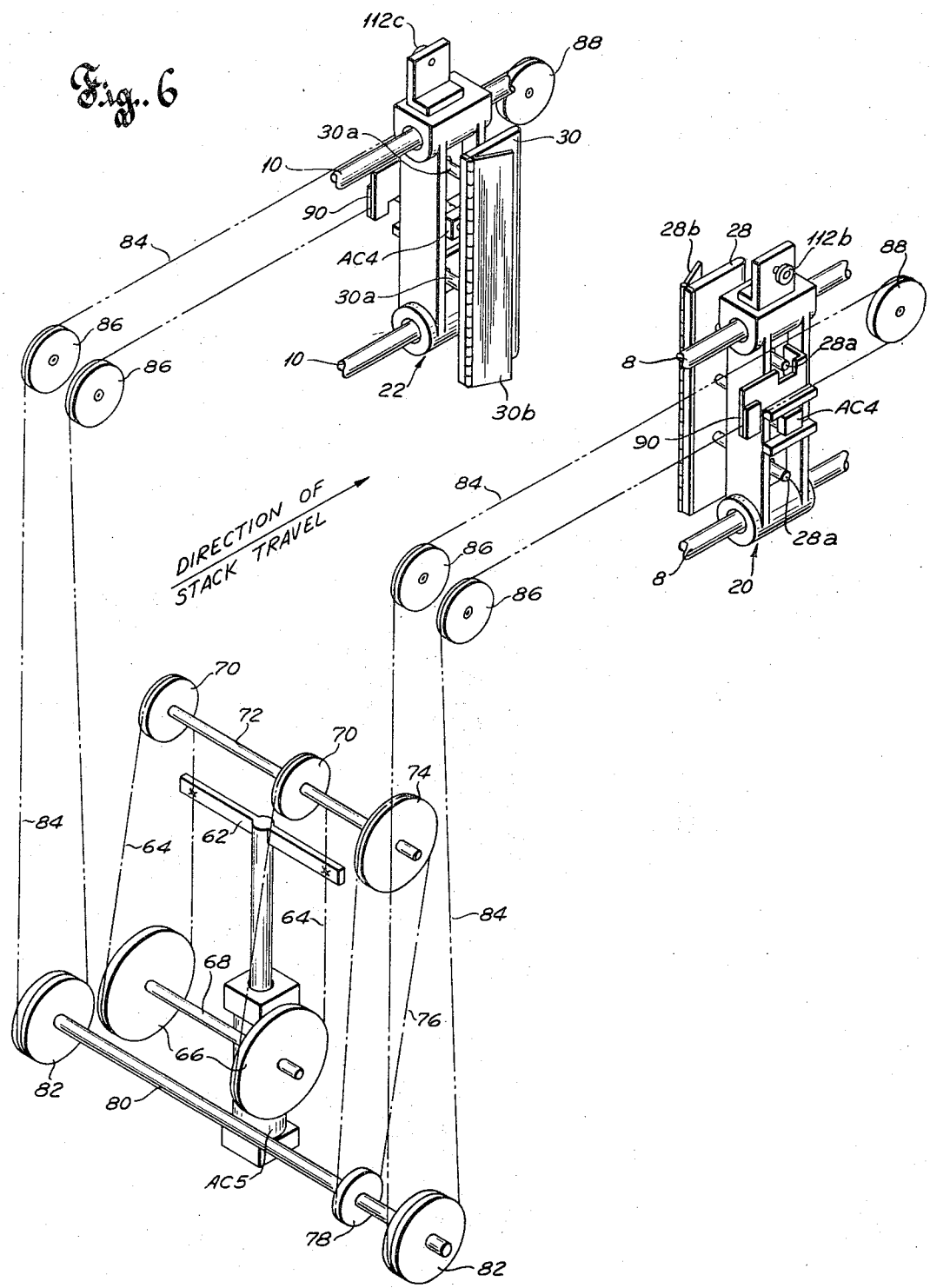

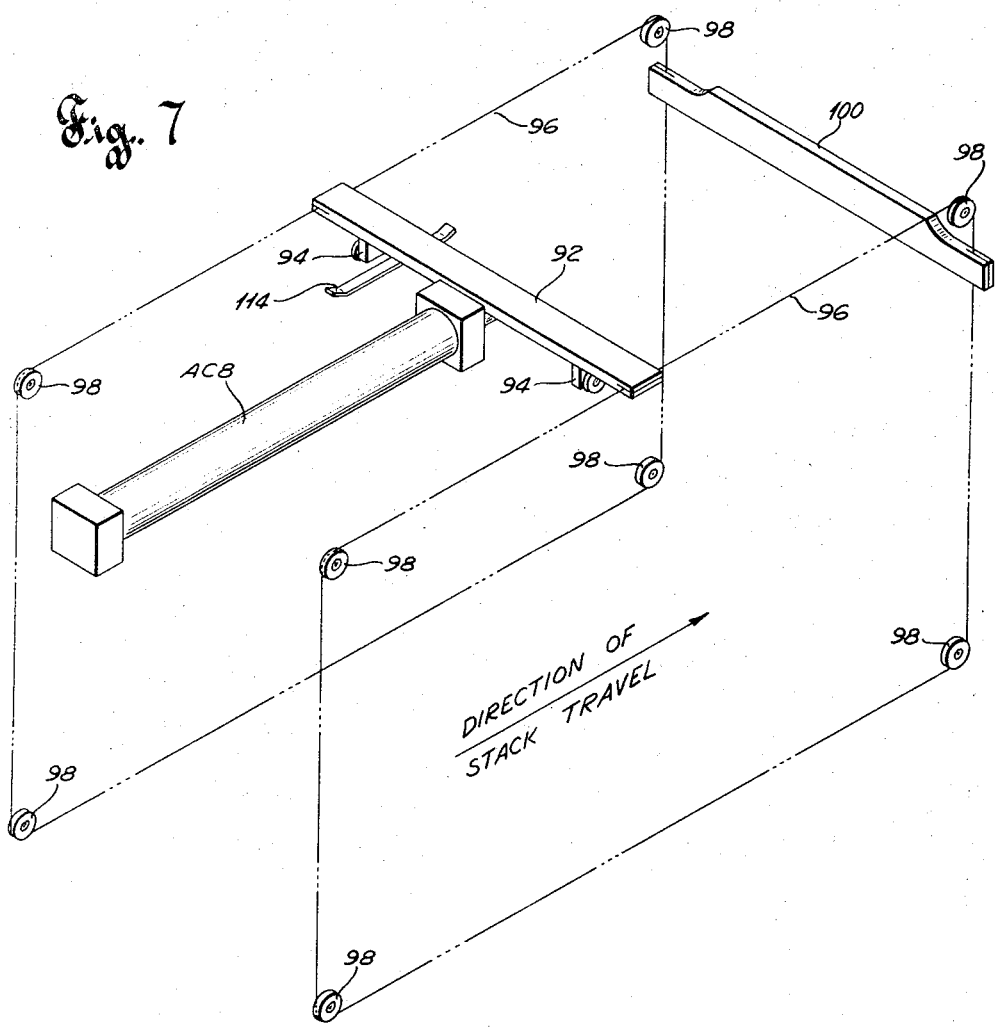

3,348,473
INLINE FEEDER DEVICE FOR TYING MACHINE
William R. Luy, Milwaukee, Wis., and John H. Trumble, San Francisco, Calif., assignors to Cutler-Hammer, Inc., Milwaukee, Wis., a corporation of Delaware
Filed July 7, 1965, Ser. No. 470,127
9 Claims. (Cl. 100—4)

This invention relates to automatic feeding devices for feeding a stack of articles to a position at which an operation is performed upon the stack.

In particular, the invention relates to newspaper mailroom apparatus wherein a device automatically feeds stacks of newspapers to a tying machine where they are bound.

In todays modern, automated newspaper plants it is necessary to obtain great speed in producing and delivering the edition once it is set in type. High speeds are essential to all components utilized in preparing the newspaper for mailing. Manual operations must be reduced to a minimum and mechanical operations must be precisely timed. Loose stacks of newspapers moved at high speeds become particularly unstable when their direction of travel is altered or stopped or when they are manually handled. One such area in which these problems exist is at the point where the stacks are fed into tying machines to be bound.

It is therefore an object of this invention to provide a device to receive stacks of articles and automatically and rapidly feed them to a tying machine.

It is another object of this invention to provide a device to eject a bound stack of articles from a tying machine upon completion of the tying operation.

It is a further object of this invention to provide means to drive a stack of articles thereagainst to thereby positively stop the stack at a preselected position within a tying machine.

It is still a further object of this invention to provide selective means to drive a stack of articles thereagainst to positively stop the stack at a plurality of preselected positions within the tying machine when the stack is to receive more than one tie.

It is still a further object of this invention to provide means to engage the full height of a loose stack of articles upon driving and stopping the stack to prevent it from becoming misformed.

Figure 1:
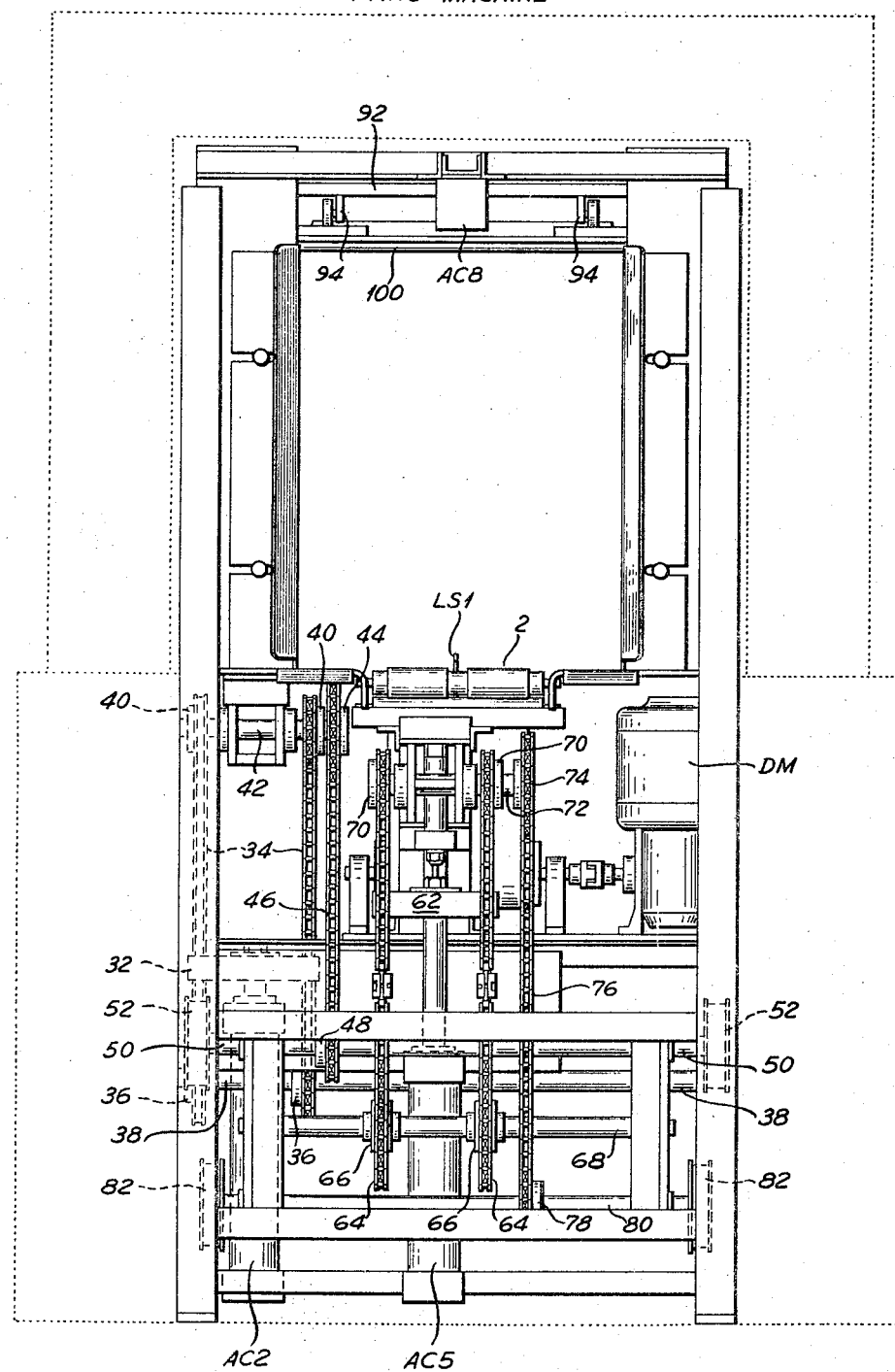
Figure 8A:
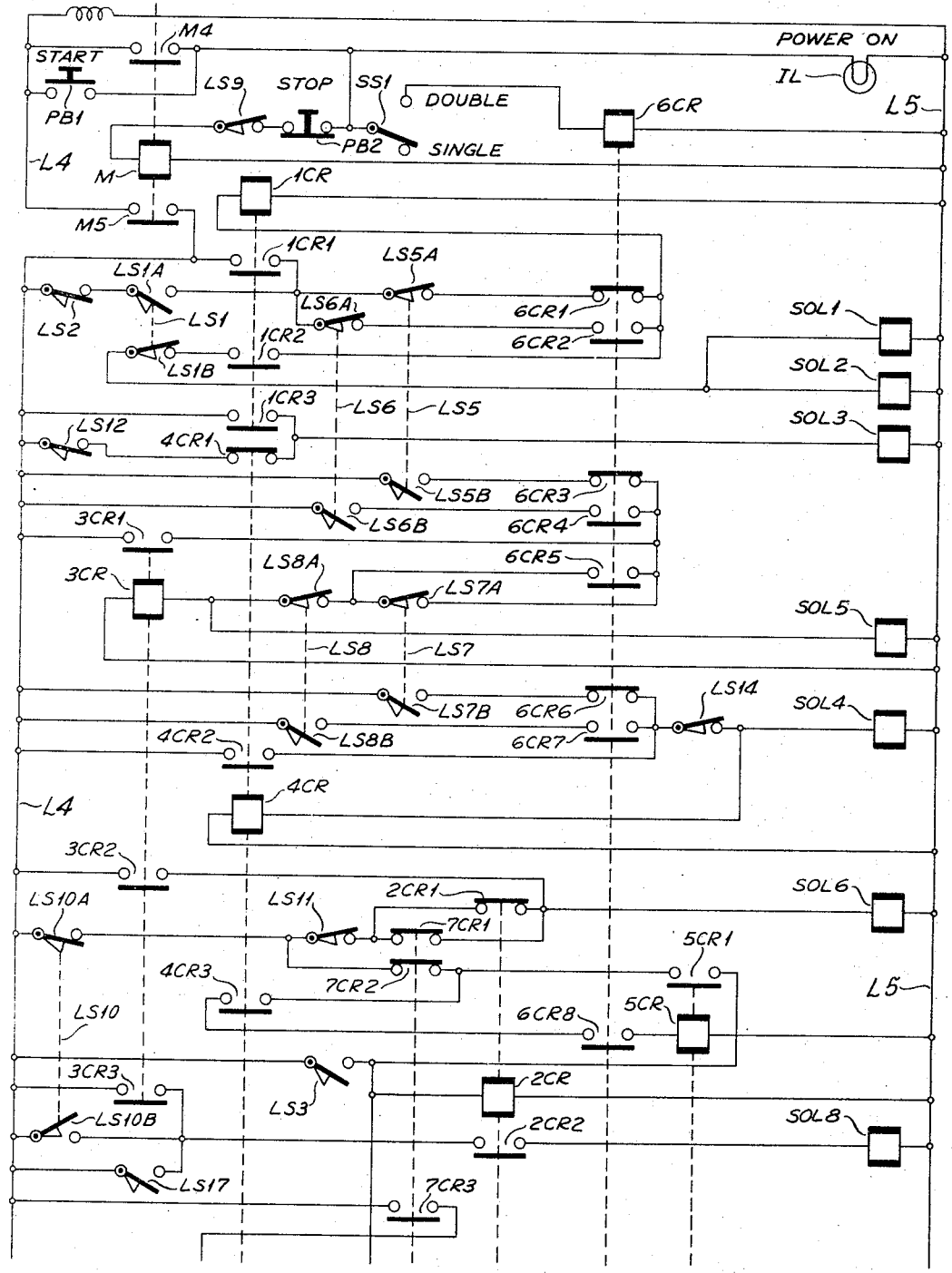
Figure 9:
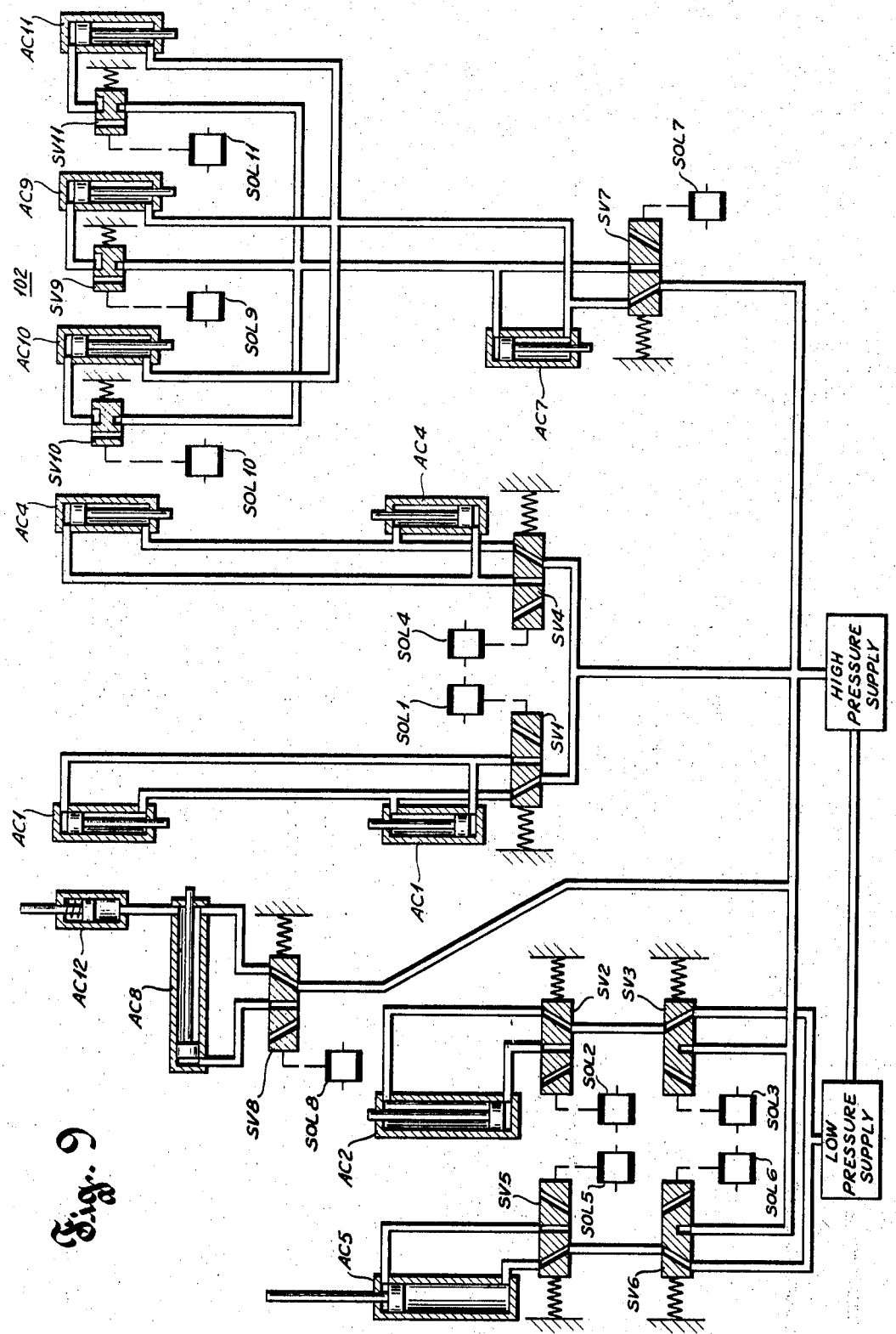

These and other objects and advantages will appear in the following specification and claims when taken in conjunction with the drawings, wherein:

FIGURE 1 is a front elevational view of the device;
FIG. 2 is a side elevational view of the right side of the device of FIG. 1;
FIG. 3 is a side elevational view of the left side of the device of FIG. 1;
FIG. 4 is a top plan view of the device;
FIG. 5 is an isometric schematic view showing a portion of the operating linkage of the device;
FIG. 6 is an isometric schematic view showing another portion of the operating linkage of the device;
FIG. 7 is an isometric schematic view of still another portion of the operating linkage of the device;
FIGS. 8a and 8b, when taken together, are a diagrammatic showing of the electrical control portion of the device; and
FIG. 9 is a schematic showing of the pneumatic control portion of the device.

The feeder machine comprises an inverted generally L-shaped skeleton frame which is mounted securely to the floor so that the horizontal leg is cantilevered over the bed of a tying machine. Stacks of articles such as newspapers travel through the length of the cantilevered horizontal leg to the tying machine. FIG. 1 is a view looking in the direction of travel of a stack of newspapers from the input end of the feeder machine. The stack is delivered to the machine by a conveyor and once it is received by the machine it is rapidly pushed into one or more tying positions, tied, and ejected from the machine as a bundle at the output end, where the bundle may be carried away by another conveyor, a chute, or other suitable means.

With reference to the drawings, the stack is carried into the machine from a delivery conveyor by a belt conveyor 2 driven by a drive motor DM. A limit switch LS1 is mounted in conveyor 2 with its actuator extending above the conveyor to be tripped by the entering stack of newspapers to initiate a cycle of operation of the feeder and tying machine.

A pair of pusher assemblies 4 and 6 are slidably mounted upon pairs of bars 8 and 10, respectively, which are secured to the feeder machine frame in the horizontal leg portion through rubber bushings to provide some shock absorbing characteristics and to reduce tolerances. Pusher assemblies 4 and 6 comprise identical castings, each having an upper and lower generally cylindrical boss joined together by an I-shaped vertical web. Each cylindrical boss contains a clearance opening concentric to its center which receives a resilient bushing which in turn houses a linear ball bearing member for engagement with its respective bar 8 or 10. This arrangement also helps to reduce shock and tolerances. Each pusher assembly 4 and 6 has an opening in its center portion of the I-shaped web midway between the upper and lower cylindrical bosses. Each assembly has one of a pair of air cylinders AC1 in its opening which is mounted to the pusher casting so that its plunger extends transversely of the path of travel of the pusher assembly along bars 8 or 10, as best seen in FIG. 5. Attached to the plungers of air cylinders AC1 are pusher bars 12 and 14 of pusher assemblies 4 and 6, respectively. Pusher bars 12 and 14 are of sufficient height to engage the full height of the tallest stack of articles the feeder machine will handle. Pusher bars 12 and 14 are maintained in vertical alinement by pairs of guide rods 12a and 14a secured to bars 12 and 14, respectively, which are reciprocally received in bearing openings in the center portion of the I-shaped web of each pusher casting. Also rigidly attached to each pusher casting are angular guide plates 16 and 18, one on each side of the pusher bar, which serve to center the stack in the machine. Plates 16 and 18 are shown best in FIG. 4. However, they have been removed from the assemblies 4 and 6 in FIG. 5 in order that the pusher bar mechanisms may show up more clearly.

A pair of ejector assemblies 20 and 22 are also slidably mounted on bars 8 and 10, respectively. Ejector assemblies 20 and 22 are identical to pusher assemblies 4 and 6 with the exception of ejector members 28 and 30 secured to the ends of the plungers of air cylinders AC4 of assemblies 20 and 22, respectively. Ejector members 28 and 30 are maintained in vertical alinement by pairs of rods 28a and 30a secured to members 28 and 30, respectively, which are reciprocally received in bearing openings in the center portion of the I-shaped web of each ejector casting. It can be seen that the members 28 and 30 are not as high as bars 12 and 14 because the members 28 and 30 only move the stack after it has at least one tie around it, as will become apparent later. Guide plates 16 are rigidly secured to the upstream side of the ejector castings identically to the pusher castings. Hinged plates 28b and 30b are attached to ejector members 28 and 30, respectively, and are spring biased to their normal position as shown in FIG. 4. The rigid guide plates 16 have been removed from the assemblies in FIG. 6 in order to more clearly show the moving mechanism of the ejector members.

With reference to FIGS. 1–5, an air cylinder AC2 is rigidly mounted in an upright manner to members of the vertical leg portion of the L-shaped frame of the feeder machine. A cross member 32 is secured in a T-fashion to the end of the plunger of air cylinder AC2 and has its ends clamped to a pair of link chains 34. Chains 34 connect a pair of large idler sprockets 36 to a pair of smaller diameter drive sprockets 40. Idler sprockets 36 are fixed on a common shaft 38 which has its ends journaled for rotation in members of the frame and drive sprockets 40 are fixed on a common shaft 42 which likewise has its ends journaled for rotation in members of the frame. In this manner, the force generated from air cylinder AC2 is more evenly distributed among the parts to prevent binding of the mechanism. A third sprocket 44, of larger diameter than sprockets 40 is also fixed on shaft 42 and is connected by a link chain 46 to a sprocket 48, which is of smaller diameter than sprocket 44 and is fixed on a shaft 50, also journaled for rotation in members of the frame of the feeder machine. A pair of cable drums 52 are fixed on shaft 50, one at each end thereof, to which the ends of a pair of cables 54 are connected to form closed loops. Each cable 54 has several turns wound on its drum 52 and then extends vertically from its drum to a pair of idler pulleys 56 mounted on the feeder machine frame. At this point each strand of the loop passes over the pulleys 56 and extend horizontally along the cantilevered portion of the frame to another idler pulley 58 attached to the frame near the output end of the machine. The loop is then placed around pulley 58 and, by drawing the ends of the cable tight within the drum through a tensioning device, the loop is made taut around the pulleys 56 and 58. A pair of bracket assemblies 60, one on each pusher casting, clamp to the cables 54 along the top horizontal strands between pulleys 56 and 58. As best seen in FIG. 5, upward movement of the plunger of air cylinder AC2 drives shaft 42 clockwise through chains 34 and sprockets 40. Shaft 42 in turn drives sprocket 44 clockwise which imparts a clockwise rotation to shaft 50 through chain 46 and sprocket 48. The drums 52 also rotate clockwise on the shaft 50, and therefore the cables 54 drive pusher assemblies 4 and 6 in unison toward the output end of the feeder machine along bars 8 and 10.

With reference to FIGS. 1–4 and 6, it can be seen that a similar arrangement exists to provide the ejector assemblies 20 and 22 with lateral movement along pairs of bars 8 and 10, respectively. An air cylinder AC5 is rigidly mounted in an upright manner to members of the vertical leg portion of the L-shaped frame of the feeder machine. A T-shaped cross member 62, secured to the end of the plunger of air cylinder AC5, is clamped at its ends to a pair of link chains 64. These chains connect a pair of large idler sprockets 66 with a pair of smaller diameter drive sprockets 70. Sprockets 66 are fixed on a common shaft 68 which is journaled for rotation in members of the frame as is shaft 72 to which sprockets 70 are fixed. A third sprocket 74 of larger diameter than sprockets 70 is also fixed on the shaft 72, and is connected by a link chain 76 to a drive sprocket 78 of smaller diameter than sprocket 74. Sprocket 78 is fixed on a shaft 80 which is journaled for rotation in members of the frame and has drums 82 fixed on its ends. The ends of a pair of cables 84 are secured to the drums 82 in the same manner as cables 54 were secured to drums 52 to form closed loops which extend vertically from each drum to pairs of idler pulleys 86 mounted on the frame at its input end. At this point, each strand of the loop passes over the pulleys 86 and extends horizontally along the cantilevered portion of the frame to another idler pulley 88 attached to the frame at the output end of the machine. The loop is then placed around pulley 88, and by drawing the ends of the cable tight within the drum, the loop is made taut around the pulleys 86 and 88. A pair of bracket assemblies 90, one on each ejector casting, clamp to cables 84 along the bottom horizontal strand between pulleys 86 and 88. As best seen in FIG. 6, downward movement of the plunger of air cylinder AC5 drives shaft 72 clockwise through chains 64 and sprockets 70. Shaft 72 in turn drives sprocket 74 clockwise which imparts a clockwise rotation to shaft 80 through chain 76 and sprocket 78. The drums 82 also rotate clockwise with shaft 80, and therefore the cables 84 drive ejector assemblies 20 and 22 toward the input end of the feeder machine along bars 8 and 10.

It will be noted that while the operation of the air cylinders AC2 and AC5 of FIGS. 5 and 6, respectively, was given in only one direction, the reverse operation of each will move the respective assemblies in the opposite directions along the respective bars, and that the described linkage transforms the vertical reciprocable movement of air cylinders AC2 and AC5 into horizontal reciprocable movement of their respective pusher and ejector assemblies. The horizontal movement of the aforementioned assemblies is also much more rapid than the vertical movement of their respective air cylinder plungers due to the "gearing" accomplished with the sprockets.

With reference now to FIGS. 1, 2, 3, 4 and 7, there is an air cylinder AC8 mounted on top of the horizontal leg of the machine parallel to the path of travel of the stack of papers. A crossbar 92 is secured to the outer end of the plunger of air cylinder AC8 to form a T with the plunger. Near its ends, crossbar 92 has depending portions 94 to which are mounted freely rotatable rollers which roll along the upper surfaces of a pair of frame members to serve as alining bearings for the crossbar. The ends of crossbar 92 are connected to a pair of cables 96 which are closed loops, each encompassing a set of four idler pulleys 98 located one at each corner of the horizontal leg of the frame. A ram member 100 is attached to the vertical portion of the cables 96 at the output end of the machine. It will be clear from FIG. 7 that as the plunger of air cylinder AC8 extends and retracts, the ram moves downwardly and upwardly, respectively.

A positive stop assembly 102 (FIGS. 2, 3 and 4) is located beyond the output end of the feeder machine and is mounted on the bed of the tying machine. This assembly comprises a rigid frame to which are mounted three air cylinders AC9, AC10 and AC11 which move respective stop plates 104, 106 and 108 transversely into and out of the path of travel of the bundle of papers. Plate 104 is utilized in a single tie operation and it is extended so the pusher assemblies 4 and 6 can push the stack of papers against it. The plates 104, 106 and 108, like pusher bars 12 and 14, are as high, or higher, than the stack of papers and therefore the entire height of the stack is positively driven and stopped to prevent any papers from sliding off the top of the stack. For double tie purposes, the stack is first driven against plate 106, which later retracts, and the bundle is then driven against the extended plate 108 for the second tie. A wooden roller 105 is provided on the other side of the path of travel directly opposite the plates 104, 106 and 108 to help keep the stack alined during the travel from plate 106 to plate 108 in the double tie operation.

Another air cylinder AC7 is mounted from the vertical portion of the machine frame to extend over a foot pedal operator for the tying machine. The tying machine was previously operated manually by depressing the foot pedal, but it is desirable, when the machine is used in connection with the feeder machine, to operate the foot pedal automatically at a preselected time in the feeder machine cycle to afford a pre-start to the tying machine to reduce the overall cycle time. The outer end of the plunger of air cylinder AC7 depresses the pedal upon the extension of the air cylinder as will be more fully described later.

Mounted longitudinally along the horizontal upper portion of the frame are plates 110, one on each side of the frame. A plurality of limit switches, which are operable during various sequences of the machine's cycle, are clamped to these bars and may be slid along the bars for adjustment. Roller type actuators 112a, 112b and 112c are secured to brackets which are mounted on the top of pusher assembly 4 and ejector assemblies 20 and 22; respectively, to actuate the aforementioned limit switches as the various assemblies move through their travel.

Operation

The machine is connected to suitable supply sources of electricity and air pressure as seen in FIGS. 8a, 8b and 9. The electrical connections are made through lines L1, L2 and L3 to a three-phase, 60-cycle A.C. source of 220 v. which supplies the drive motor DM. A step-down transformer PT is connected across lines L1 and L2 to provide the rest of the system with 110 v. power. The air supply lines are connected to a source of 80 to 100 p.s.i. With these connections made, the electrical portion of the machine is shown in its "at rest," or denergized state, diagrammatically in FIGS. 8a and 8b and the pneumatic portion of the machine is shown "at rest" schematically in FIG. 9.

To start the machine, a pushbutton START switch PB1 is closed momentarily to energize a main contactor M by completing a circuit from line L4 through switch PB1, a pushbutton STOP switch PB2 and a normally closed limit switch LS9 to line L5. Limit switch LS9 is located on the tying machine to open upon detection of a break in the tying wire to remove all electrical power from the feeder machine if such a break occurs. When contactor M is energized, its contacts M1, M2 and M3 close to connect drive motor DM to the 220 v. source, contact M4 closes to hold around pushbutton PB1 and to energize POWER ON indicating light IL, and contact M5 closes to connect the rest of the circuit to line L4.

The right-hand side of contact M4 is connected to a two-position selector switch SS1 which is manually set for either SINGLE or DOUBLE tie machine control. The circuit remains open when the switch is in the SINGLE tie position, and the circuit is completed to energize a control relay 6CR when the switch is in its DOUBLE tie position. The system will be first described with the switch SS1 in its SINGLE tie position as shown in FIG. 8a.

As a stack of papers is carried into the machine by belt conveyor 2 powered by drive motor DM, the leading edge of the stack trips limit switch LS1, closing its contact LS1A and opening its contact LS1B. Closure of contact LS1A completes a circuit from line L4 through contact LS1A, a normally open limit switch LS2 which is held closed at this time by the actuator 112a on the fully retracted pusher assembly 4 as viewed in FIG. 2, a normally closed contact LS5A of a limit switch LS5, a normally closed contact 6CR1 of relay 6CR and through the operating coil of a control relay 1CR to line L5 to energize the relay 1CR. Upon energization, the relay 1CR closes its contacts 1CR1, 1CR2 and 1CR3. Contact 1CR1 provides a maintaining circuit around contact LS1A and switch LS2 to maintain relay 1CR energized after the stack of papers releases limit switch LS1. Contact 1CR3 closes to complete a circuit from line L4 through contact 1CR3 and a solenoid SOL3 to line L5 to insure that solenoid SOL3 is energized. It will be apparent from FIG. 8a that solenoid SOL3 is already energized at the described time by the circuit from line L4 through a closed limit switch LS12 and a closed contact 4CR1 of a control relay 4CR to the solenoid and line L5. Limit switch LS12 is mounted on the top of the machine (FIGS. 3 and 4) and is held closed by the roller on one of the depending members 94 of the crossbar 92 when the ram 100 is in its fully retracted position. Upon energization, solenoid SOL3 pushes a two position, spring-return slide valve SV3 to its right-hand position as seen in FIG. 9 to remove low pressure air from the pusher air cylinder AC2 and apply high pressure to the latter. The low pressure air is supplied to various air cylinders in the machine at certain times as a safety precaution.

As the stack of papers is carried further into the machine by belt conveyor 2 the trailing end of the stack releases the operator of limit switch LS1 and the latter opens its contact LS1A and closes its contact LS1B. This completes a circuit from line L4 through contact 1CR1, contact LS5A of limit switch LS5, contacts 6CR1, 1CR2, LS1B of limit switch LS1, and then in parallel through a pair of solenoids SOL1 and SOL2 to line L5 to energize these solenoids.

Upon energization, solenoid SOL1 pushes a two-position, spring-return slide valve SV1 to its left-hand position (FIG. 9) to place high pressure air on the rear of the pistons of air cylinders AC1 on pusher assemblies 4 and 6 to extend the pusher bars 12 and 14 behind the stack of papers.

Simultaneously, the energization of solenoid SOL2 causes the latter to move the two-position, spring-return slide valve SV2 to its right-hand position (FIG. 9) to place high pressure air to the rear of the piston of air cylinder AC2 to extend the plunger of the latter. As seen in FIG. 5, extension of the plunger of air cylinder AC2 moves the pusher assemblies, and hence the stack of papers, forwardly.

As the pusher assemblies move the stack forwardly, roller 112a on pusher assembly 4 releases the actuator of limit switch LS2 mounted on plate 110 to open the latter and thus prevent any subsequent actuation of limit switch LS1 from initiating another cycle until the pusher assemblies are again fully retracted. Roller 112a also trips limit switch LS3 upon its forward movement to momentarily close the switch. This completes a circuit from line L4 to line L5 through the operating coil of a control relay 2CR to energize the latter which closes its normally open contacts 2CR3 and 2CR4. Contact 2CR3, when closed, completes a circuit from line L4 to line L5 through the operating coils of a pair of parallel connected timer relays 1TR and 2TR. Timer relay 1TR has a normally open contact 1TR1 which closes immediately upon energization of the timer and remains closed for a preselected time interval, such as 1.93 seconds, to maintain control relay 2CR energized for that period of time after the momentary closing of limit switch LS3. Timer relay 2TR has a normally open contact 2TR1 which also closes immediately upon energization of the timer, and simultaneous to the closure of contact 1TR1, and remains closed for a preselected time interval, such as 1.5 seconds. A circuit is completed from line L4 to line L5 through a solenoid SOL7 when the contact 2TR1 is closed, thus energizing the solenoid. In turn, solenoid SOL7 pushes a two-position, spring-return slide valve SV7 to its left-hand position (FIG. 9) to place high pressure air on the rear of the piston of an air cylinder AC7 and in the lines that lead to the slide valves that control air cylinders AC9, AC10 and AC11. The plunger of air cylinder AC7 extends to depress the foot pedal on the tying machine to start the latter to cycle, and remains extended for 1.5 seconds until timer 2TR times out. The tying machine cycle is initiated at the same time as timer 1TR is energized, and the cycle is completed in 1.93 seconds, which is the length of time that timer 1TR is set to remain closed. The contact 2CR4, which closed when relay 2CR was energized, completes a circuit from line L4 through contact 2CR4, contact 6CR9 of a control relay 6CR and a solenoid SOL9 to line L5 to energize solenoid SOL9 simultaneous to the energization of timers 1TR and 2TR. Solenoid SOL9 moves a two-position spring-return slide valve SV9 to its right-hand position (FIG. 9) to open the line leading to the rear of the piston of air cylinder AC9 to cause the latter to extend its plunger which carries with it stop plate 104 of positive stop assembly 102 upon the aforedescribed movement of valve SV7 to its left-hand position. The plate 104 is driven transversely into the path of the stack of papers and remains there until timer 2TR times out to deenergize solenoid SOL7 to allow valve SV7 to return to its right-hand position, thus placing high pressure air at the front of the piston of air cylinder AC9. During this time interval the pusher assemblies 4 and 6 push the stack against the plate 104.

Near the end of travel of pusher assemblies 4 and 6 in their forward direction the roller 112a on pusher 4 trips limit switch LS5 mounted on plate 110. Actuation of limit switch LS5 opens its contact LS5A to drop out control relay 1CR which in turn deenergizes solenoids SOL1, SOL2 and SOL3, therefore releasing the slide valves SV1, SV2 and SV3, respectively, which are spring returned to their original positions to retract the pusher bars 12 and 14, to retract the pusher assemblies 4 and 6, and to place low pressure air to the pusher cylinder AC2 so that the assemblies return slowly to the input end of the machine under low pressure air. Limit switch LS5 also closes its contact LS5B upon actuation by roller 112a. This completes a circuit from line L4 through contact LS5, a contact 6CR3, a contact LS7A of a limit switch LS7, a contact LS8A of a limit switch LS8, and the operating coil of a control relay 3CR. The latter, in turn, closes its contact 3CR1 to maintain itself energized in shunt of contact LS5B of limit switch LS5, and closes a contact 3CR2 to complete a circuit from line L4 to line L5 through a solenoid SOL6, which when energized moves a two-position, spring-return slide valve SV6 to its left position (FIG. 9) to place high pressure air to the ejector mechanism air cylinder AC5. A circuit is also completed upon closure of contact LS5B from a point between contact LS8A and the coil of relay 3CR to line LR through a solenoid SOL5 to energize the latter. Solenoid SOL5 then moves a two-position spring-return slide valve SV5 to its left-hand position as viewed in FIG. 9 to place high pressure air on the front of the piston of air cylinder AC5 of the ejector mechanism to cause the air cylinder to retract its plunger, which moves the ejector assemblies 20 and 22 toward the input end, or to the rear of the stack of papers, as can be seen in FIG. 6. Relay 3CR also closes its contact 3CR3 which completes a circuit from line L4 through contact 3CR3 and closes contact 2CR2 of energized relay 2CR, and a solenoid SOL8 to line L5 to energize the solenoid SOL8. The latter pushes a two-position, spring-return slide valve SV8 to the right-hand position (FIG. 9) to place high pressure air on the rear of the piston of air cylinder AC8 to extend the plunger of the latter whereby the arm 100 is moved downwardly, as described in connection with FIG. 7, into engagement with the stack of papers to compress the same. It will be noticed in FIG. 9 that when high pressure air is placed on the rear of the piston of air cylinder AC8, the front portion of that cylinder is exhausted to the atmosphere. An air cylinder AC12, connected to the front portion of AC8, is likewise exhausted to the atmosphere to retract its spring loaded plunger as is apparent from FIG. 9. Retraction of the plunger of air cylinder AC12 releases limit switch LS10 which opens its contact LS10A and closes its contact LS10B, the latter maintaining a circuit to solenoid SOL8 in shunt of contact 3CR3.

As the ejector assemblies retract to points behind the stack of papers, roller 112c on assembly 22 trips a limit switch LS7 mounted on plate 110. Limit switch LS7 opens its contact LS7A which drops out relay 3CR and solenoid SOL5. The latter allows slide valve SV5 to be spring returned to its right-hand position (FIG. 9) to place air on the rear of the piston in air cylinder AC5. Relay 3CR opens its contact 3CR2 to drop out solenoid SOL6 which releases slide valve SV6 and places air cylinder AC5 under low pressure air. The limit switch LS7 also closes its contact LS7B to complete a circuit from line L4 through contact LS7B, contact 6CR6, a limit switch LS14, and a solenoid SOL4 to line L5 to energize the solenoid SOL4. The latter moves a two-position, spring-return slide valve SV4 to the right (FIG. 9) to place high pressure air on the rear of the pistons of air cylinders AC4 mounted in the ejector assemblies 20 and 22 to cause the air cylinders to extend their plungers, which extend the ejector members 28 and 30 behind the stack of papers. At this time the ejector assemblies are creeping up behind the stack of papers under low pressure air until they reach the stack and stop against it while they wait for the tying machine to complete its tie. Relay 3CR also opens its contact 3CR3 in the circuit to solenoid SOL8 upon its deenergization, but the solenoid SOL8 remains energized by the now closed contact LS10B. Simultaneously, to the energization of solenoid SOL4, relay 4CR energizes to close its own maintaining contact 4CR2 and contacts 4CR3 and 4CR4 and also opens its contact 4CR1 in the circuit to solenoid SOL3 to insure that low pressure air remains on the pusher assemblies through air cylinder AC2.

Timer relay 2TR times out next to open its contact 2TR1 and drop out solenoid SOL7 which releases the slide valve SV7 and places high pressure air on the front of the pistons of air cylinders AC7, AC9, AC10 and AC11 to cause any extended plungers to retract. Air cylinder AC7 releases the tying machine foot pedal upon the retraction of its plunger, and air cylinder AC9 withdraws the positive stop plate 104 from in front of the stack of papers upon its plunger retraction, while air cylinders AC10 and AC11 remain motionless because their plungers were already in their retracted positions.

Timer relay 1TR times out next to open its contact 1TR1 which in turn drops out relay 2CR. The latter opens its contact 2CR2 to deenergize solenoid SOL8 which releases slide valve SV8 and the latter returns to its left-hand position (FIG. 9) to place high pressure air on the front of air cylinder AC8 to cause the ram to raise and to extend the plunger of air cylinder AC12 to actuate limit switch LS10. Relay 2CR also opens its contact 2CR3 to deenergize timers 2TR and 1TR and opens its contact 2CR4 to deenergize solenoid SOL9 to allow the latter to release the slide valve SV9 at the positive stop assembly 102.

The actuation of limit switch LS10 by high air pressure in air cylinder AC12 closes the contact LS10A to complete a circuit from line L4 through the contact LS10A, a limit switch LS11, contact 2CR1 and the solenoid SOL6 to line L5 to energize the solenoid SOL6. The latter pushes slide valve SV6 to its left-hand position (FIG. 9) to place high pressure air on the rear of the piston of air cylinder AC5 to cause the ejector mechanism to immediately eject the tied bundle from the machine. The limit switch LS11 in the line to solenoid SOL6 is a safety switch to prevent the application of high pressure on the ejector air cylinder AC5 until the ram has raised high enough for the members 28 and 30 to clear it. The limit switch LS11 is mounted on the top of the machine and is actuated by a cam member 114 secured to the crossbar 92 as seen in FIGS. 2, 3, 4 and 7. When the plunger is fully retracted, one of the depending portions 94 of crossbar 92 closes limit switch LS12 to apply high pressure on the pusher air cylinder again by energizing solenoid SOL3 when the relay 4CR drops out and the pushers are ready for the next stack of papers. Roller 112c on the ejector assembly 22 trips limit switch LS14 at the end of the ejection stroke, and the limit switch opens to drop out solenoid SOL4, which releases the slide valve SV4 to retract the ejector members 28 and 30 of air cylinders AC4 and to drop out relay 4CR, thus restoring the entire system for the next cycle in a single tie operation.

When the feeder machine is used for double tie operation, numerous operations of the various components of the system are repetitive of those just described in the single tie opreation, and will therefore only be mentioned briefly in the following description.

With the machine running, the selector switch SS1 is turned to its DOUBLE tie position to connect relay 6CR across lines L4 and L5, thereby energizing the latter to actuate contacts 6CR1–6CR10.

A stack of papers is carried into the feeder machine by belt conveyor 2 and the leading edge of the stack trips limit switch LS1. This energizes relay 1CR which in turn closes its contact 1CR1 to maintain itself energized in shunt of switch LS1 and a limit switch LS2. Relay 1CR also closes its contact 1CR3 to energize solenoid SOL3 which in turn places high pressure air to the air cylinder AC2 of the pusher assembly linkage.

As the stack of papers travels further into the feeder machine on conveyor 2, the trailing edge releases the switch LS1 which recloses its contact LS1B to energize solenoids SOL1 and SOL2. The solenoids in turn extend the pusher bars 12 and 14 and start the pusher assemblies 4 and 6 moving forward, respectively. The roller 112a on pusher assembly 4 releases limit switch LS2 and then trips limit switch LS3. Limit switch LS3 closes upon actuation and energizes relay 2CR which closes its contact 2CR3 to energize timer relays 1TR and 2TR and closes its contact 2CR4 to energize solenoid SOL10. Timer 1TR closes its contact 1TR1 which maintains relay 2CR energized in shunt of limit switch LS3 for a period of 1.93 seconds. Timer 2TR closes its contact 2TR1 to energize solenoid SOL7 for a period of 1.5 seconds. Solenoid SOL7 in turn actuates its corresponding slide valve in FIGURE 9 to cause the plunger of air cylinder AC7 to depress the foot pedal of the tying machine for 1.5 seconds and to place high pressure air in the lines leading to the control valves for the positive stop plates 104, 106 and 108. The energization of solenoid SOL10 causes its respective valve and air cylinder of the stop mechanism 102 in FIG. 9 to extend the first positive stop plate 106 as was plate 104 in the previous description.

As the pusher assemblies 4 and 6 push the stack against the plate 106, roller 112a on assembly 4 trips limit switch LS6 mounted on the plate 110 of FIG. 2. It will be noticed in the diagram in FIG. 8a that in the single tie operation, limit switch LS6 was not in circuit due to the normally open contacts 6CR2 and 6CR4 of relay 6CR, and that the limit switch LS6 is in the circuit for the double tie operation while limit switch LS5 is now out of the circuit due to contacts 6CR1 and 6CR3 being open. Limit switch LS6 performs the same function as limit switch LS5 except that due to their respective locations, limit switch LS6 is tripped earlier in the travel of the pushers. It can also be seen that an identical situation exists between limit switches LS7 and LS8.

The actuation of limit switch LS6 deenergizes relay 1CR which in turn opens its contact 1CR2 to drop out solenoids SOL1 and SOL2. Deenergization of the solenoid SOL1 causes the pusher bars 12 and 14 to retract and the deenergization of solenoid SOL2 causes the pusher cylinder AC2 to retract, thereby returning the pusher assemblies 4 and 6 to their initial receiving position. Limit switch LS6 also energizes relay 3CR and solenoid SOL5 upon the same actuation mentioned above. Relay 3CR thereupon closes its contact 3CR2 to energize solenoid SOL6 which in turn places high pressure air on the ejector cylinder AC5. Solenoid SOL5 causes retraction of the plunger of cylinder AC5 which moves the ejector assemblies 20 and 22 backward to a point behind the stack of papers. Relay 3CR also closes its contact 3CR3 to energize solenoid SOL8 which causes the ram 100 to lower and limit switch LS10 to be released. As ram 100 lowers, it releases limit switch LS12 to allow it to open and drop out solenoid SOL3 which removes high pressure air from the pusher cylinder AC2.

As the ejector assemblies 20 and 22 retract to their position behind the stack of papers, the roller 112c which is mounted on ejector assembly 22 trips limit switch LS8 which drops out relay 3CR and solenoid SOL5 in the same way as limit switch LS7 did in the single tie, the difference being that LS8 allows the ejector assemblies to retract further before dropping out these components due to its placement on plate 110 of FIG. 3. The actuation of limit switch LS8 energizes relay 4CR and solenoid SOL4. When relay 3CR drops out, the solenoid SOL6 becomes deenergized to place low pressure air on the ejector cylinder AC5 and when SOL5 is deenergized, its slide valve SV5 causes the cylinder to extend its plunger again. Solenoid SOL4 energizes to cause the ejector members 28 and 30 to extend behind the stack of papers, and with these operations complete the ejector assemblies 20 and 22 creep up behind the stack of papers under low air pressure.

At this time the ram is compressing the stack of papers and the tying machine is performing its first tie. The timer 2TR times out to open its contact 2TR1 and drop out solenoid SOL7. The solenoid then effects the release of the foot pedal of the tying machine and places high pressure air in the lines to the front of the pistons in the air cylinders AC9, AC10 and AC11 of the positive stop mechanism 102 which thereby retracts plate 106. Timer 1TR next times out after the tying machine has completed its tie. The timer 1TR opens its contact 1TR1 to drop out relay 2CR which in turn opens its contact 2CR2 to drop out solenoid SOL8. The latter then releases its slide valve in FIG. 9 and places high pressure air on the front of the piston in air cylinder AC8 and behind the piston in air cylinder AC12. The latter closes limit switch LS10 immediately and air cylinder AC8 retracts its plunger to raise the ram 100. Limit switch LS10 closes its contact LS10A to energize solenoid SOL6 which again places high pressure air on the ejector cylinder AC5 to cause it to move the ejector assemblies 20 and 22, and therefore the stack of papers forward. Limit switch LS10 also completes a circuit from line L4 through contacts 8CR2, 4CR3 and 6CR8 and the operating coil of a relay 5CR to line L5 to energize the relay. Relay 5CR closes its contact 5CR1 to connect the coil of relay 2CR to line L4 again and thereby energizes the latter. Relay 2CR recloses its contact 2CR2 and as the roller 112c on ejector assembly 22 moves forward with the assembly, it trips limit switch LS17 to close the switch and complete a circuit to solenoid SOL8 to energize the solenoid and thereby start the ram to lower again. Relay 2CR also closes its contacts 2CR2 to energize timers 1TR and 2TR which maintains relay 2CR energized and depresses the foot pedal to start the tying machine, respectively. In addition, timer 2TR places high pressure air in the lines to the control valves for the positive stop mechanism 102. Relay 5CR also opens its contact 5CR2 and closes its contact 5CR3, thus when 2CR energizes it closes its contact 2CR4 and energizes solenoid SOL11 to cause the latter to extend positive stop plate 108 in the same manner that plates 104 and 106 were extended. The ejector assemblies then drive the stack into the extended stop plate 108. As the ram lowers, the limit switch LS10 again is released which removes the high pressure air from the ejector cylinder AC5 by deenergizing solenoid SOL6 and drops out relay 5CR. The latter in turn opens its contact 5CR3 to deenergize solenoid SOL11 to remove any high pressure from air cyinder AC11.

During its forward travel, the ejector assembly 20 carried its roller 112b into engagement with a limit switch LS13, which trips upon actuation in a forward direction only, to close the latter. The switch then completed a circuit from line L4 through itself, a contact 4CR4 and a relay 7CR to line L5 to energize the relay. Relay 7CR maintains itself in shunt of limit switch LS13 by its contact 7CR3 and it opens its contact 7CR2 to prevent any further energization of relay 5CR and therefore any further recycling.

Timer 2TR next times out, dropping out solenoid SOL7 which releases the foot pedal and retracts positive stop plate 108 simultaneously. Then timer 1TR times out to deenergize relay 2CR which in turn deenergizes the solenoid SOL8 to raise the ram 100 and close the limit switch LS10. The latter reenergizes solenoid SOL6 which places high pressure air on the ejector assemblies 20 and 22 move the tied bundle forward and out of the machine. At the end of the ejector travel, roller 112c on ejector assembly 22 trips a limit switch LS14 to drop out solenoid SOL4 which allows the ejector members to retract and to drop out relay 4CR which again places high pressure air on the pusher cylinder AC2 because the ram has closed limit switch LS12.

We claim:

1. A feeder device for use in cooperation with a bundle tying machine, said feeder device comprising, in combination:

a receiving portion for receiving a stack of articles from a delivery source;

pusher means reciprocably movable along a linear path between stack receiving and stack tying positions to move a stack of articles between said stack receiving and said stack tying positions;

means responsive to the arrival of a stack at said receiving position to cause said pusher means to receive and move said stack to said tying position;

stop means movable between stack interferring and non-interferring positions;

means responsive to movement of said pusher means from said receiving position to said tying position to initiate a tying operation of said tying machine prior to the arrival of said stack at said tying position and also to cause said stop means to move to said stack interferring position to stop said stack at said tying position;

ejector means reciprocably movable to move a tied bundle of articles between said stack tying and a bundle ejecting position;

means responsive to the arrival of said stack at said tying position to cause said pusher means to return to said stack receiving position and to cause said ejector means to move to said tying position to receive the stack thereat; and means operable subsequent to completion of a tying operation to first cause said stop means to move to said non-interferring position and then to cause the first mentioned movement of said ejector means.

2. The combination according to claim 1, together with means responsive to the arrival of said ejector means at said ejecting position to prevent said means responsive to the arrival of a stack at said receiving position from causing said pusher means to receive and move a subsequent stack to said tying position until said ejector means has arrived at said ejecting position to eject the bundle thereat.

3. The combination according to claim 2, together with gates on said pusher means movable between stack engaging and non-engaging positions, said means responsive to the arrival of a stack at said receiving position causing said gates to move to said stack engaging position and said means responsive to the arrival of said stack at said tying position causing said gates to move to said non-engaging position.

4. The combination according to claim 3, together with gates on said ejector means movable between stack engaging and non-engaging positions, means responsive to the arrival of said ejector means at said tying position, said last mentioned means causing said gates on said ejector means to move to stack engaging position, and said means responsive to the arrival of said ejector means at said ejecting position causing said gates on said ejector means to move to said non-engaging position.

5. The combination according to claim 4, together with ram means operable to compress said stack of articles when the latter is in said tying position and operable subsequent to completion of a tying operation to release said tied bundle.

6. The combination according to claim 1, wherein: said stop means comprises a plurality of spaced apart stop means individually and sequentially movable between stack interferring and non-interferring positions to effect first and second tying positions for said stack of articles;

said means responsive to movement of said pusher means from said receiving position to said tying position operates in response to said movement to initiate a tying operation of said tying machine prior to the arrival of said stack at a first tying position and to cause a first one of said stop means to move to said stack interferring position to stop said stack at said first tying position;

together with means responsive to the arrival of said stack at said first tying position to cause said pusher means to return to said stack receiving position and cause said ejector means to move to said first tying position to receive the stack thereat;

means operable upon completion of said tying operation of said tying machine to first initiate a second tying operation of said tying machine, then to cause said first one of said plurality of sto pmeans to move to said non-interferring position, thereafter to cause a second one of said stop means to move to an interferring position and finally to cause said ejector means to move the bundle to a second tying position against said second stop means; and means operable subsequent to completion of said second tying operation to cause said second stop means to move to said non-interferring position and then to cause said ejector means to move said bundle to said ejecting position.

7. In a feeder device for use in cooperation with a bundle tying machine;

first gate means operable to engage a stack of articles in a stack receiving position;

pusher means reciprocably movable along a linear path between stack receiving and stack tying positions and operable to move said first gate means, and hence said stack, to a predetermined one of a plurality of stack tying positions;

a plurality of spaced apart stop means individually operable to arrest the travel of said stack at a predetermined one of said plurality of tying positions;

means operable to initiate a tying operation of said tying machine prior to the arrival of said stack at said tying position;

second gate means operable to engage said stack at said tying position;

ejector means reciprocably movable and operable subsequent to completion of said tying operation to move said second gate means, and hence said stack to an ejecting position;

a plurality of power responsive means individual to each of the aforementioned means which, when energized, effect the operations of said aforementioned means; and control means including a plurality of electrical limit switches to coordinate and direct the energization of said power responsive means to affect the operations of said aforementioned means in the sequence described.

8. The combination according to claim 7, wherein said control means further includes selective switch means which, when in one operating position, allows the device to function as aforedescribed, and when in another operating position causes said first gate means and said pusher means to move said stack to a first tying position against a first one of said plurality of stop means, also causes said means operable to initiate a tying operation of said tying machine to initiate a second tying operation subsequent to completion of a first tying operation, and causes said second gate means and said ejector means to move said stack to a second tying position against another one of said plurality of stop means also subsequent to completion of the first tying operation, and finally causes said second gate means and ejector means to move said stack to said ejecting position subsequent to the completion of said second tying operation.

9. The combination according to claim 8, wherein said control means further includes timer means operated upon the initiation of a tying operation and set for the time interval needed to complete said tying operation.

References Cited

UNITED STATES PATENTS

| | | | |
|---|---|---|---|
| 2,181,088 | 11/1939 | Horton et al. | 93—93 |
| 2,619,027 | 11/1952 | Sykes | 100—4 |
| 2,672,079 | 3/1954 | Chandler | 93—93 |
| 2,684,626 | 7/1954 | Eberle | 100—4 |
| 2,850,963 | 9/1958 | Grebe et al. | 100—4 |
| 2,882,659 | 4/1959 | Daniels | 53—74 |
| 2,964,160 | 12/1960 | Powers | 198—24 |
| 3,114,308 | 12/1953 | Saxton et al. | 100—4 |
| 3,198,105 | 8/1965 | Smith | 100—3 |
| 3,225,684 | 12/1965 | Smith | 100—4 |
| 3,260,191 | 7/1966 | Pierson et al. | 100—4 |

BILLY J. WILHITE, *Primary Examiner.*

UNITED STATES PATENT OFFICE
CERTIFICATE OF CORRECTION

Patent No. 3,348,473                  October 24, 1967

William R. Luy et al.

It is hereby certified that error appears in the above numbered patent requiring correction and that the said Letters Patent should read as corrected below.

Column 2, line 56, for "rods 28a and 30a" read -- guide rods 28a and 30a --; column 7, line 19, for "contact LS5" read -- contact LS5B --; line 31, for "line LR" read -- line L5 --; column 11, lines 2 and 3, for "the ejector assemblies" read -- the ejector cylinder AC5 and the ejector assemblies --; column 12, line 21, for "sto pmeans" read -- stop means --.

Signed and sealed this 22nd day of October 1968.

(SEAL)
Attest:

Edward M. Fletcher, Jr.                  EDWARD J. BRENNER
Attesting Officer                        Commissioner of Patents